(12) United States Patent
Lindeman

(10) Patent No.: US 7,089,411 B2
(45) Date of Patent: Aug. 8, 2006

(54) METHOD AND APPARATUS FOR PROVIDING DEVICE INFORMATION DURING RUNTIME OPERATION OF A DATA PROCESSING SYSTEM

(75) Inventor: James A. Lindeman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 10/424,488

(22) Filed: Apr. 25, 2003

(65) Prior Publication Data

US 2004/0215950 A1    Oct. 28, 2004

(51) Int. Cl.
*G06F 15/177* (2006.01)

(52) U.S. Cl. .......................................................... 713/1

(58) Field of Classification Search ................ 713/1
See application file for complete search history.

(56) References Cited

U.S. PATENT DOCUMENTS

| | | | |
|---|---|---|---|
| 5,630,076 A * | 5/1997 | Saulpaugh et al. ......... 710/104 |
| 5,802,365 A * | 9/1998 | Kathail et al. .............. 719/321 |
| 5,968,136 A * | 10/1999 | Saulpaugh et al. ............ 710/3 |
| 6,219,828 B1 * | 4/2001 | Lee .............................. 717/129 |
| 6,263,378 B1 * | 7/2001 | Rudoff et al. ............... 719/327 |
| 6,745,269 B1 * | 6/2004 | Bui et al. .................... 710/104 |
| 6,834,340 B1 * | 12/2004 | Lee et al. .................... 713/100 |
| 6,944,756 B1 * | 9/2005 | Thomas, III ................... 713/1 |
| 2003/0056090 A1 * | 3/2003 | Khanna et al. ................ 713/1 |
| 2004/0123086 A1 * | 6/2004 | Rothman et al. .............. 713/1 |

* cited by examiner

*Primary Examiner*—Chun Cao
(74) *Attorney, Agent, or Firm*—Duke W. Yee; Thomas E. Tyson; Peter B. Manzo

(57) ABSTRACT

A method, apparatus, and computer instructions for providing device information to an operating system. A first instance of an open firmware is loaded. Device information is generated for devices in the data processing system using the first instance of the open firmware. An operating system is loaded for the data processing system using the open firmware. A second instance of the open firmware is loaded. The second instance of the open firmware is enabled to provide device information in response to a request from the operating system during runtime operation of the operating system.

18 Claims, 5 Drawing Sheets

100 DATA PROCESSING SYSTEM

700

```
0 > ls
000000c86120: /ibm,serial@0              000000ca8ed8:  /memory@25000000
000000c86af8: /chosen                    000000ca90c8:  /memory@26000000
000000c86d50: /packages                  000000ca92b8:  /memory@27000000
000000c86e68:   /disassembler            000000ca94a8:  /memory@28000000
000000c8d258:   /assembler               000000ca9698:  /memory@29000000
000000cb04e0:   /dev-tree                000000ca9888:  /memory@2a000000
000000cb0cc0:   /deblocker               000000ca9a78:  /memory@2b000000
000000cb1c50:   /disk-label              000000ca9c68:  /memory@2c000000
000000cb5930:   /tape-label              000000ca9e58:  /memory@2d000000
000000cb5c38:   /obp-tftp                000000caa048:  /memory@2e000000
000000cc0960:   /prep-boot               000000caa238:  /memory@2f000000
000000cc1140:   /fat-files               000000caa428:  /memory@30000000
000000cc3368:   /iso-13346-files         000000caa618:  /memory@31000000
000000cccbc8:   /utilities               000000caa808:  /memory@32000000
000000cd9398:   /net                     000000caa9f8:  /memory@33000000
000000cdb688:   /iso-9660-files          000000caabe8:  /memory@34000000
000000cdca20:   /boot-mgr                000000caadd8:  /memory@35000000
000000cec288:   /chrp-loader             000000caafc8:  /memory@36000000
000000cec488:   /pe-loader               000000cab1b8:  /memory@37000000
000000cecd58:   /elf-loader              000000cab3a8:  /memory@38000000
000000cef398:   /terminal-emulator       000000cab598:  /memory@39000000
000000cef4b0:   /dynamic-reconfig        000000cab788:  /memory@3a000000
000000d32aa8:   /gui                     000000cab978:  /memory@3b000000
000000d8dec0:   /post                    000000cabb68:  /memory@3c000000
000000c9fab0: /cpus                      000000cabd58:  /memory@3d000000
000000ca2870:   /PowerPC,RS64-IV@0       000000cabf48:  /memory@3e000000
000000ca2fb0:    /l2-cache               000000cac138:  /memory@3f000000
000000ca3ec0:   /memory@0                000000cac328:  /memory-controller@3fffd000000
000000ca6628:   /memory@10000000         000000cacb70:  /nvram@800000000087bc00
000000ca6818:   /memory@11000000         000000cacef0:  /options
000000ca6a08:   /memory@12000000         000000cadd28:  /aliases
000000ca6bf8:   /memory@13000000         000000cef998:  /openprom
000000ca6de8:   /memory@14000000         000000cefb60:  /event-sources
000000ca6fd8:   /memory@15000000         000000cf0ac8:   /epow-events
000000ca71c8:   /memory@16000000         000000cf0bd8:   /io-events
000000ca73b8:   /memory@17000000         000000cf0ce0:  /interrupt-
000000ca75a8:   /memory@18000000         controller@3e00f000000
000000ca7798:   /memory@19000000         000000cf2030:  /interrupt-controller@c00080a400
000000ca7988:   /memory@1a000000         000000cf2c70:  /rtas
000000ca7b78:   /memory@1b000000         000000d056d8:  /vdevice
000000ca7d68:   /memory@1c000000         000000d063a8:   /vty@0
000000ca7f58:   /memory@1d000000         000000d07260:   /IBM,sp@4000
000000ca8148:   /memory@1e000000         000000d080e8:   /rtc@4001
000000ca8338:   /memory@1f000000         000000d09008:  /pci@800000020000025
000000ca8528:   /memory@20000000         000000d0fb28:   /pci@2,3
000000ca8718:   /memory@21000000         000000d1bf28:    /scsi@1
000000ca8908:   /memory@22000000         000000d22c00:     /sd
000000ca8af8:   /memory@23000000         000000d23ed8:     /st
000000ca8ce8:   /memory@24000000         000000d14540:   /pci@2,4
                                         000000d25700:    /ethernet@1
```

```
000007e86128:  /ibm,serial@1
000007e86b00:  /chosen
000007e86d58:  /packages
000007e86e70:  /disassembler
000007e8d260:  /assembler
000007eaa9e8:  /dlpar
000007eaf530:  /dev-tree
000007e9fab8:  /cpus
000007ea2d30:  /memory@0
000007ea5ce0:  /nvram@800000000087bc00
000007ea6060:  /options
000007ea6e98:  /aliases
000007ea9650:  /vdevice
000007eb0a78:  /interrupt-controller@c000808400
000007eb16b8:  /pci@800000020000026
```

METHOD AND APPARATUS FOR PROVIDING DEVICE INFORMATION DURING RUNTIME OPERATION OF A DATA PROCESSING SYSTEM

BACKGROUND OF THE INVENTION

1. Technical Field

The present invention relates generally to an improved data processing system and in particular to a method and apparatus for initializing a data processing system. Still more particularly, the present invention provides a method, apparatus, and computer instructions for establishing a runtime environment using a firmware image for booting a data processing system.

2. Description of Related Art

Open firmware is a nonproprietary boot firmware that is usable on different types of processors and buses. Boot firmware is the read only memory (ROM) based software that controls a computer from the time that it is turned on until the primary operating system has taken control of the machine. The main function of boot firmware is to initialize the hardware and then to "boot" (load and execute) the primary operating system. Additionally, open firmware also describes the functional topology of a data processing system. At boot-time, open firmware is less constrained by limitations than firmware components, which are invoked by an operating system after the boot stage.

Runtime firmware is required to be sensitive to the amount of memory and which memory can be accessed because runtime firmware can not assume that it has control of the entire system. Likewise, the functionality demanded from runtime firmware is a subset of that required at boot-time or initialization. The runtime firmware only needs to describe, but does not need to operate new devices added after boot or initialization of the data processing system.

IEEE 1275-1994 Open Firmware specification describes a firmware, which is incompatible with runtime requirement. For example, on servers with large configurations, such as ones with more than 100 PCI devices, the amount of memory required to represent device tree devices and methods may be large. The memory may, in some cases, take up 10 or more megabytes. For this reason, data processing systems only use open firmware at boot-time and use a different firmware after the operating system has been booted because of the memory requirements and usage by open firmware. The use of different firmware after booting of the operating system requires processes to be coded a second time for the runtime firmware. Such a system can be time consuming. First, open firmware is typically coded in a computer language called Forth, while runtime firmware is often coded using C. These two languages also have different structures. As a result, in addition to having to generate code in a different language, debugging of the runtime firmware also is required.

Therefore, it would be advantageous to have a method, apparatus, and computer instructions for establishing a runtime open firmware environment using open firmware design for initializing a data processing system.

SUMMARY OF THE INVENTION

The present invention provides a method, apparatus, and computer instructions for providing device information to an operating system. A first instance of an open firmware is loaded. Device information is generated for devices in the data processing system using the first instance of the open firmware. An operating system is loaded for the data processing system using the open firmware. A second instance of the open firmware is loaded. The second instance of the open firmware is enabled to provide device information in response to a request from the operating system during runtime operation of the operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating a currently created device tree; and

DETAILED DESCRIPTION OF THE PREFERRED EMBODIMENT

Figure 1:
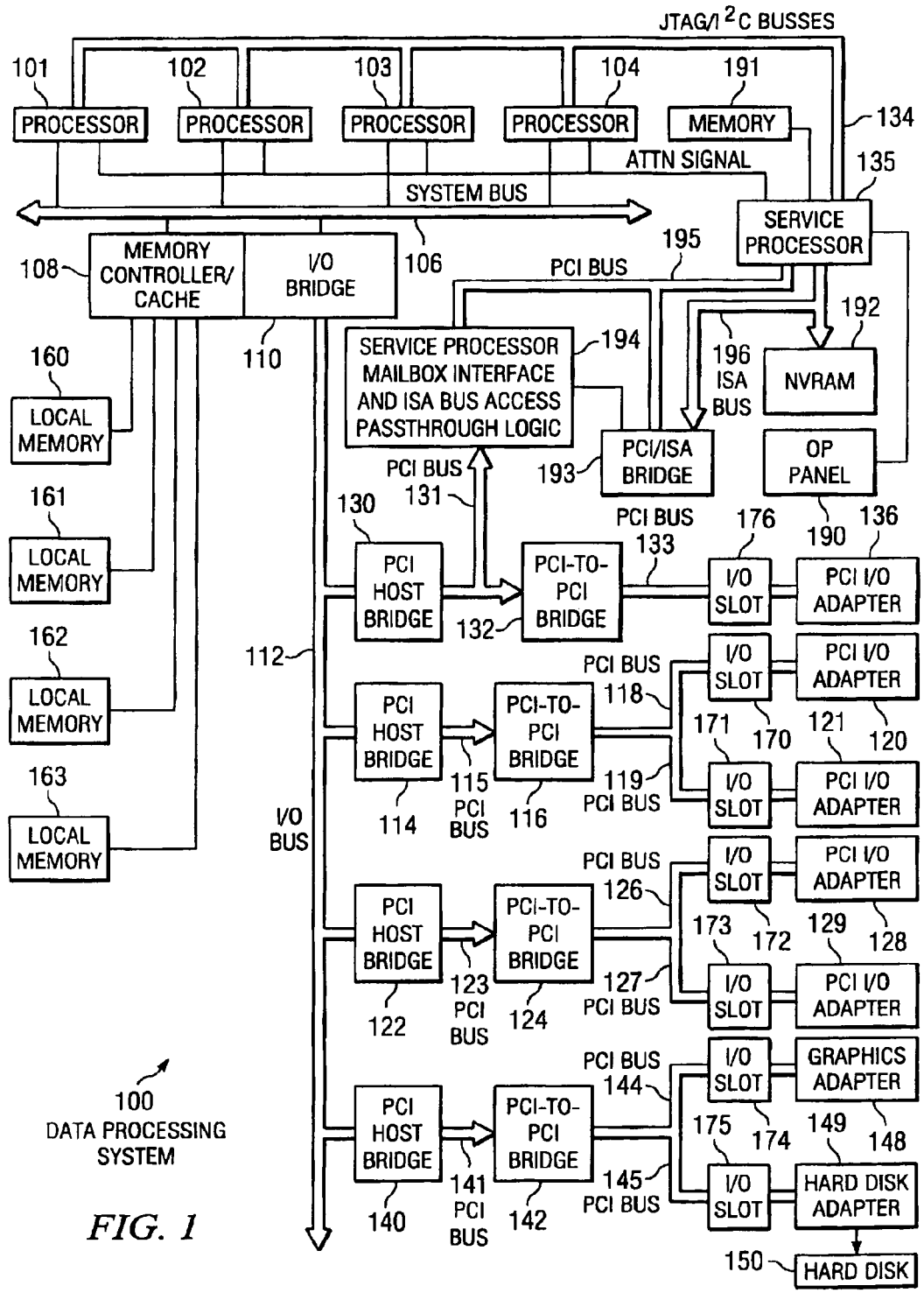
FIG. 1 is a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120–121, 128–129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120–121, 128–129, 136, graphics adapter 148, hard disk adapter 149, each of host processors 101–104, and memory from local memories 160–163 is assigned to each of the three partitions. In these examples, memories 160–163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160–163, and I/O adapters 120, 128, and 129 may be assigned to logical partition P1; processors 102–103, some portion of memory from local memories 160–163, and PCI I/O adapters 121 and 136 may be assigned to partition P2; and processor 104, some portion of memory from local memories 160–163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows XP operating system may be operating within logical partition P3. Windows XP is a product and trademark of Microsoft Corporation of Redmond, Wash.

Peripheral component interconnect (PCI) host bridge 114 connected to I/O bus 112 provides an interface to PCI local bus 115. A number of PCI input/output adapters 120–121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120–121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128–129. PCI I/O adapters 128–129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128–129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101–104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101–104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101–104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160–163. Service processor 135 then releases host processors 101–104 for execution of the code loaded into local memory 160–163. While host processors 101–104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101–104, local memories 160–163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
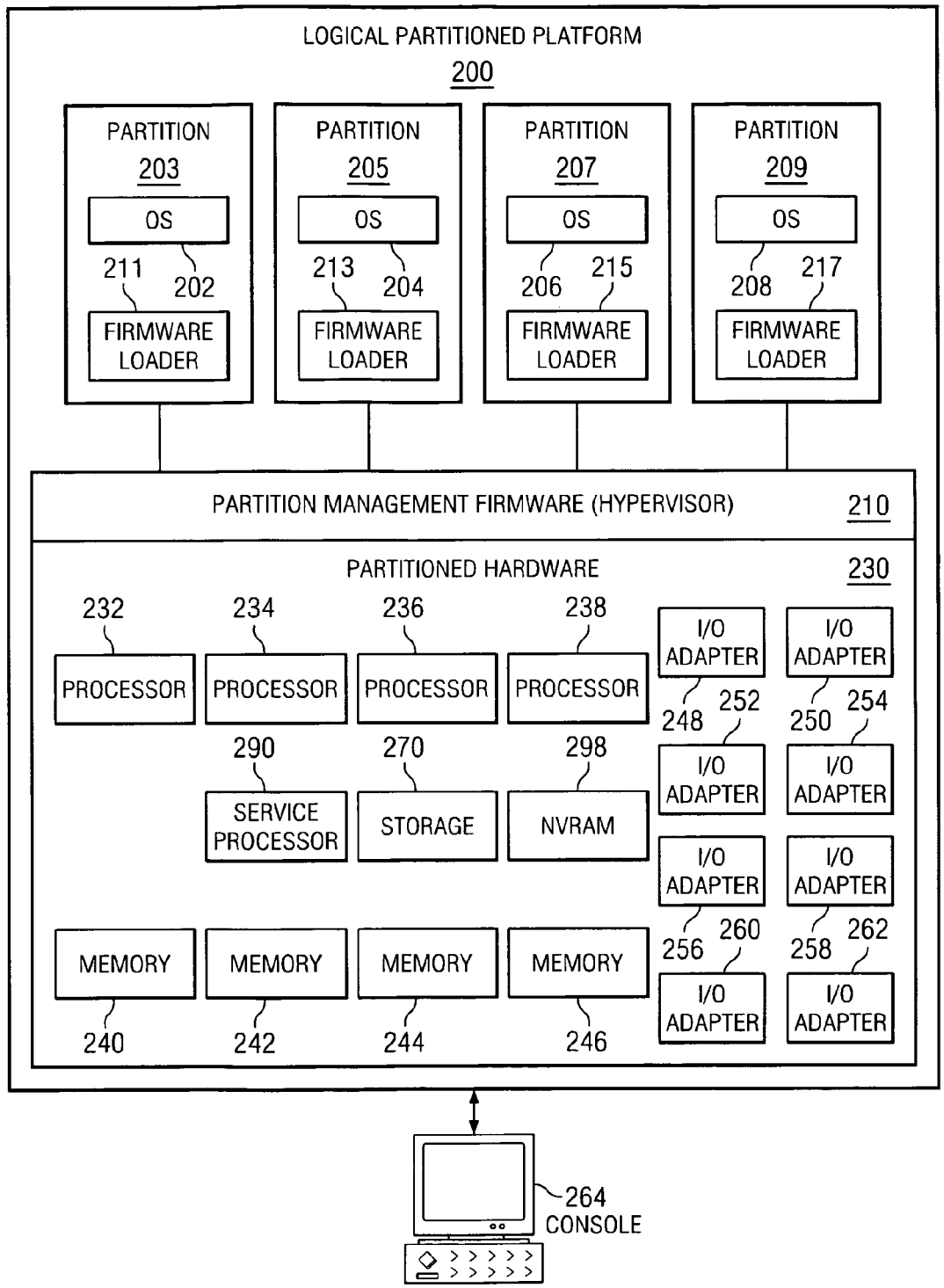
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and hypervisor 210. Operating systems 202, 204, 206, and 208 may be multiple copies of a single operating system or multiple heterogeneous operating systems simultaneously run on platform 200. These operating systems may be implemented using OS/400, which are designed to interface with a hypervisor. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the hypervisor's partition manager. The processors associated or assigned to the partitions are then dispatched to the partition's memory to execute the partition firmware.

Partitioned hardware 230 includes a plurality of processors 232–238, a plurality of system memory units 240–246, a plurality of input/output (I/O) adapters 248–262, and a storage unit 270. Partitioned hardware 230 also includes service processor 290, which may be used to provide various services, such as processing of errors in the partitions. Each of the processors 232–238, memory units 240–246, NVRAM storage 298, and I/O adapters 248–262 may be assigned to one of multiple partitions within logical partitioned platform 200, each of which corresponds to one of operating systems 202, 204, 206, and 208.

Partition management firmware (hypervisor) 210 performs a number of functions and services for partitions 203, 205, 207, and 209 to create and enforce the partitioning of logical partitioned platform 200. Hypervisor 210 is a firmware implemented virtual machine identical to the underlying hardware. Hypervisor software is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, hypervisor 210 allows the simultaneous execution of independent OS images 202, 204, 206, and 208 by virtualizing all the hardware resources of logical partitioned platform 200.

Operations of the different partitions may be controlled through a hardware management console, such as console 264. Console 264 is a separate data processing system from which a system administrator may perform various functions including reallocation of resources to different partitions.

The illustration of a logical partitioned data processing system in FIGS. 1 and 2 are provided as examples. The present invention may be implemented in other types of data processing systems in which open firmware is used to boot the operating system. For example, the present invention may be implemented in a non logical partitioned data processing system having one or more processors.

The present invention provides an improved method, apparatus, and computer instructions for establishing a runtime open firmware environment from a boot-time open firmware image. The runtime version of the open firmware is an instantiation of the bootcode open firmware in these examples. The runtime version has different portions of the open firmware code enabled to provide descriptions of devices to the operating system. As illustrated, this device information is passed through a device tree.

In the runtime version, the open firmware generates a minimally configured device tree containing only information for a new device or for new devices requested by the operating system, rather than for all devices in the data processing system. Further, the nodes containing the information in the device tree are deleted once the information has been provided to the operating system. In this manner, the amount of memory used by this runtime version of the open firmware is minimalized.

Figure 3A:
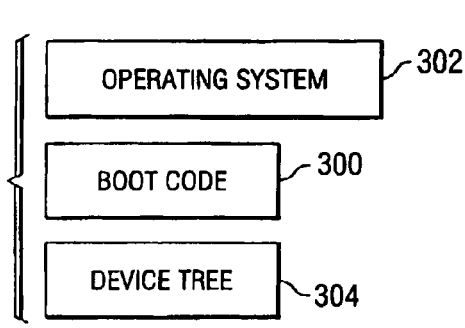
FIGS. 3A and 3B are diagrams illustrating components used in establishing a runtime open firmware environment from a boot-time open firmware image in accordance with a preferred embodiment of the present invention.
Figure 3B:
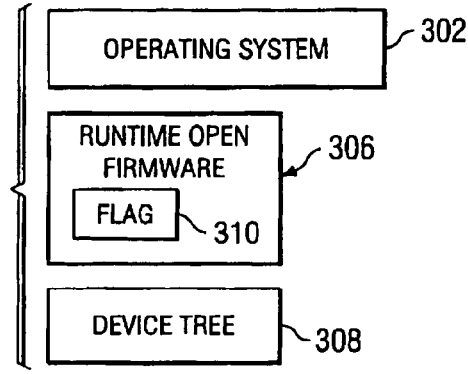

With reference now to FIGS. 3A and 3B, diagrams illustrating components used in establishing a runtime open firmware environment from a boot-time open firmware image are depicted in accordance with a preferred embodiment of the present invention. In these examples, the initialization of the operating system is illustrated for a single partition, such as partition 203 in FIG. 2.

In FIG. 3A, Bootcode 300 is open firmware used to boot operating system 302. As part of the boot process, boot code 300 creates device tree 304, which contains device information in nodes. Device tree 304 contains device information for all devices within the data processing system.

After boot code 300 finishes loading operating system 302, boot code 300 will load another instance of the open firmware, such as runtime open firmware 306 in FIG. 3B. Runtime open firmware 306 is a runtime instantiation of boot code 300. This instantiation includes an enablement of a process to create device tree 308 when operating system 302 requests information for one or more new devices. Device tree 308 is a smaller device tree than device tree 304. Device tree 308 contains nodes only for device information for the new device or devices requested by the operating system, rather than all devices present in the data processing system. The new device tree nodes are removed from device tree 308 after the device information has been passed to operating system 302 by runtime open firmware 306.

In these examples, these processes are enabled in runtime open firmware 306 when flag 310 is set. As described, boot code 300 includes the same code as runtime open firmware 306 except for a flag, such as flag 310, is not set. Additionally, portions of code within runtime open firmware 306 may be disabled when flag 310 is set. For example, code used to operate devices is not enabled in runtime open firmware 306.

Runtime open firmware 306 is loaded into the same memory location that runtime firmware is normally loaded. For example, runtime open firmware 306 is loaded into the same memory location as a RTAS function provided in a logical partitioned data processing system. An additional example is that system exception handlers will not be installed by runtime open firmware 306. Further, runtime open firmware 306 copies any remaining source code that may be needed into its memory space. This source code is Forth source code, which is used to support dynamic addition of new devices to the data processing system.

Runtime open firmware 306 uses the client interface normally used by operating system 302 to interact with boot-time open firmware, such as boot code 300, to communicate device tree details for new devices to operating system 302. These device tree details are those located within device tree 308 in these examples.

Figure 4:
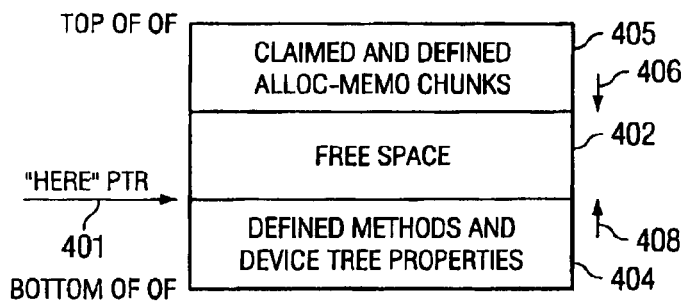
FIG. 4 is a diagram illustrating open memory in accordance with a preferred embodiment of the present invention.

Turning now to FIG. 4, a diagram illustrating open memory is depicted in accordance with a preferred embodiment of the present invention. Before finishing instantiation, the runtime open firmware saves addresses and data of selected device tree pointers defining the end points of the device tree. This information is saved in defined methods and device tree properties section 404. Also, "here" pointer 401, which defines the current end of the Forth vocabulary, is saved. In these examples, the vocabulary is a set of executable code and functions that have been runtime compiled by a Forth compiler. The source code that is interpreted may be located in a number of locations, such as a PCI device or in host firmware memory. As additional methods and device tree nodes are needed, memory is allocated from free space in section 402 in the direction as indicated by arrow 408. In these examples, device tree properties for nodes are pairs of character strings, specifically property name and property data. As used herein, methods are a subset of vocabulary specific to a device tree node. Section 402 contains free space in the memory allocated to the open firmware. Section 405 contains claimed and defined allocation memory chunks, which are defined in the direction of arrow 406 as needed. These memory chunks are ones claimed for use by open firmware methods, which need dynamic storage space during execution.

The runtime open firmware supports dynamic addition of new devices to the data processing system. The feature is provided by copying the necessary firmware device drivers into the runtime firmware memory during instantiation of the runtime open firmware and by interpreting those drivers when requested by the appropriate client interface method.

With respect to device tree nodes that are no longer needed, the runtime open firmware will free up memory by restoring saved device tree pointers, restoring "here" pointer 401 and by releasing the list of allocated memory buffers, such as those in section 404, the runtime open firmware deletes the new device tree nodes and any new methods that were defined in those nodes. Restoring the device tree pointers prevents future device tree traversals from accessing deleted nodes and methods. These deleted nodes and methods are the ones higher in address space than the newly lowered "here" pointer.

Figure 5:
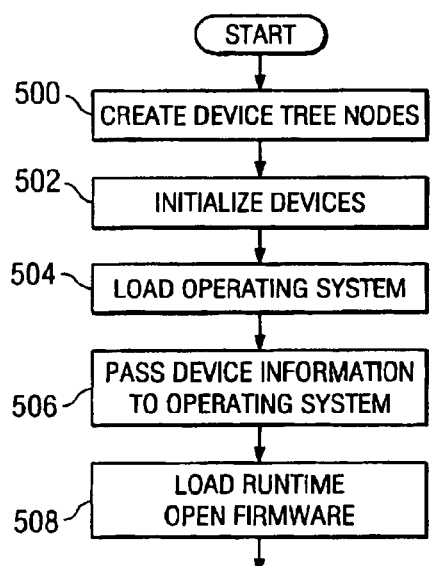
FIG. 5 is a flowchart of a process for establishing a runtime open firmware environment in accordance with a preferred embodiment of the present invention.

With reference now to FIG. 5, a flowchart of a process for establishing a runtime open firmware environment is depicted in accordance with a preferred embodiment of the present invention. The process illustrated in FIG. 5 may be implemented in boot-time open firmware, such as boot code 300 in FIG. 3A.

The process begins by creating device tree nodes (step 500). These device tree nodes are for all devices in the data processing system. Thereafter, the devices are initialized (step 502). Then, the operating system is loaded (step 504). Next, device information is passed to the operating system (step 506). This device tree information is passed to the operating system through presently available client interfaces. A pointer to the device tree is passed to the operating system. Runtime open firmware is then loaded (step 508), with the process terminating thereafter.

The runtime open firmware is an instance of the boot code initializing the system with additional features enabled. As described above, the runtime version of the open firmware includes memory management processes to free up memory after device information in a device tree has been passed to the operating system. Further, this runtime version of the open firmware also generates device tree nodes only for new devices requested by the operating system, rather than all devices in the data processing system.

Figure 6:
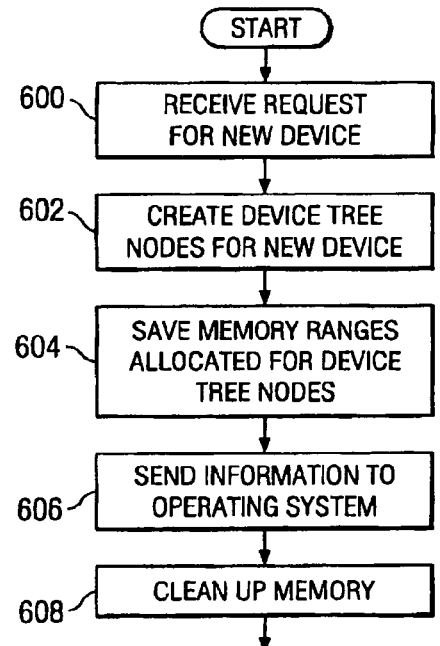
FIG. 6 is a flowchart of a process for providing device information in accordance with a preferred embodiment of the present invention.

Turning next to FIG. 6, a flowchart of a process for providing device information is depicted in accordance with a preferred embodiment of the present invention. The process illustrated may be implemented in open firmware, such as runtime open firmware 306 in FIG. 3B.

The process begins by receiving a request for information for a new device from the operating system (step 600). This request is received from the operating system in the same manner that runtime firmware would handle such requests. This process does not require changes to the manner in which the operating system makes requests for device information. Next, device tree nodes for the new device are created (step 602). These nodes contain the device information for the new device. These device tree nodes are stored within memory allocated by the process within open firmware memory, such as that illustrated in FIG. 4. The memory ranges allocated for the device tree nodes are saved (step 604).

The device information is then sent to the operating system (step 606). This information may be sent to the operating system in a number of different ways. For example, the operating system may be provided with a pointer to the runtime open firmware's client interface. The operating system already uses this interface to read the device tree provided by the firmware at boot-time. Alternatively, an existing runtime firmware layer may be modified to communicate with the runtime open firmware to pass the device information. This type of implementation provides for backward compatibility. Many current runtime firmware already have a communication method for device tree properties. The operating system may query the firmware for one property at a time until the firmware states that it has finished describing the desired tree nodes. For example, the following return codes may be returned to the operating system from this interface: 0: Configuration complete; 1: Next sibling; 2: Next child; 3: Next property; and 4: Previous parent.

Turning now to FIG. 7, a diagram illustrating a currently created device tree is depicted. Device tree 700 is a bare minimum device tree that remains during runtime. This device tree is created by runtime open firmware 306 in FIG. 3B, and is represented as device tree 308 in FIG. 3B. In these examples, device tree 700 is for a single partition.

Figure 8:
FIG. 8 is a diagram of nodes added to a device tree created by runtime open firmware in accordance with a preferred embodiment of the present invention.

Next, FIG. 8 illustrates nodes added to a device tree created by runtime open firmware 306 in FIG. 3B in accordance with a preferred embodiment of the present invention. Nodes 800 contain two nodes that are added to device tree 700 in response to a request for information on new devices. In this particular example, nodes 800 represent a primary host bridge and an interrupt controller for the primary host bridge. Nodes 800 are provided to the operating system in response to the request. These nodes are deleted after the operating system receives the information.

Thus, the present invention provides a method, apparatus, and computer instructions for providing a runtime open firmware environment using a boot-time open firmware image. In this manner, rewriting of code in another language is avoided. In these examples, the open firmware is written in Forth, while runtime firmware is normally written in C. By using a runtime open firmware image with memory management and limited device tree node creation, additional time needed to produce and debug runtime firmware is reduced.

Thereafter, the memory is cleaned up after the device information has been passed to the operating system (step 608), with the process terminating thereafter. In this example, the memory may be cleaned up by restoring saved device tree pointers, restoring the "here" pointer and by releasing the list of allocated memory buffers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing device information, the method comprising:
    loading a first instance of an open firmware;
    generating device information for devices in the data processing system using the first instance of the firmware;
    loading an operating system for the data processing system using the firmware; and
    loading a second instance of the open firmware, wherein the second instance of the firmware is enabled to provide device information in response to a request from the operating system during runtime operation of the operating system.
2. The method of claim 1, wherein the second instance of the firmware is a modified version of the first instance of the firmware.
3. The method of claim 1, wherein the second instance of the firmware is enabled by setting a flag in the firmware.
4. The method of claim 1, wherein the second instance of the firmware is loaded in a memory location normally occupied by a hardware interface.
5. The method of claim 4, wherein the hardware interface is a runtime abstraction service.
6. The method of claim 1, wherein the second instance of the firmware only provides device information for one or more new devices in response to the request from the operating system during runtime operation of the operating system, and wherein the device information for the one or more new devices is deleted from memory after the device information is provided to the operating system.
7. A data processing system for providing device information, the data processing system comprising:
    first loading means for loading a first instance of a firmware;
    generating means for generating device information for devices in the data processing system using the first instance of the firmware;
    second loading means for loading an operating system for the data processing system using the firmware; and
    third loading means for loading a second instance of the open firmware, wherein the second instance of the firmware is enabled to provide device information in response to a request from the operating system during runtime operation of the operating system.
8. The data processing system of claim 7, wherein the second instance of the firmware is a modified version of the first instance of the firmware.
9. The data processing system of claim 7, wherein the second instance of the firmware is enabled by setting a flag in the firmware.
10. The data processing system of claim 7, wherein the second instance of the firmware is loaded in a memory location normally occupied by a hardware interface.
11. The data processing system of claim 10, wherein the hardware interface is a runtime abstraction service.
12. The data processing system of claim 7, wherein the second instance of the firmware only provides device information for one or more new devices in response to the request from the operating system during runtime operation of the operating system, and wherein the device information for the one or more new devices is deleted from memory after the device information is provided to the operating system.
13. A computer program product in a computer readable storage medium for providing device information in a data processing system, the computer program product comprising:
    first instructions for loading a first instance of a firmware;
    second instructions for generating device information for devices in the data processing system using the first instance of the firmware;
    third instructions for loading an operating system for the data processing system using the firmware; and
    fourth instructions for loading a second instance of the firmware, wherein the second instance of the firmware is enabled to provide device information in response to a request from the operating system during runtime operation of the operating system.
14. The computer program product of claim 13, wherein the second instance of the firmware is a modified version of the first instance of the firmware.
15. The computer program product of claim 13, wherein the second instance of rho firmware is enabled by setting a flag in the firmware.
16. The computer program product of claim 13, wherein the second instance of the firmware is loaded in a memory location normally occupied by a hardware interface.
17. The computer program product of claim 16, wherein the hardware interface is a runtime abstraction service.
18. The computer program product of claim 13, wherein the second instance of the firmware only provides device information for one or more new devices in response to the request from the operating system during runtime operation of the operating system, and wherein the device information for the one or more new devices is deleted from memory after the device information is provided to the operating system.

* * * * *